Dec. 13, 1955  E. W. TODD  2,726,589
HITCH STABILIZER
Filed Dec. 20, 1954
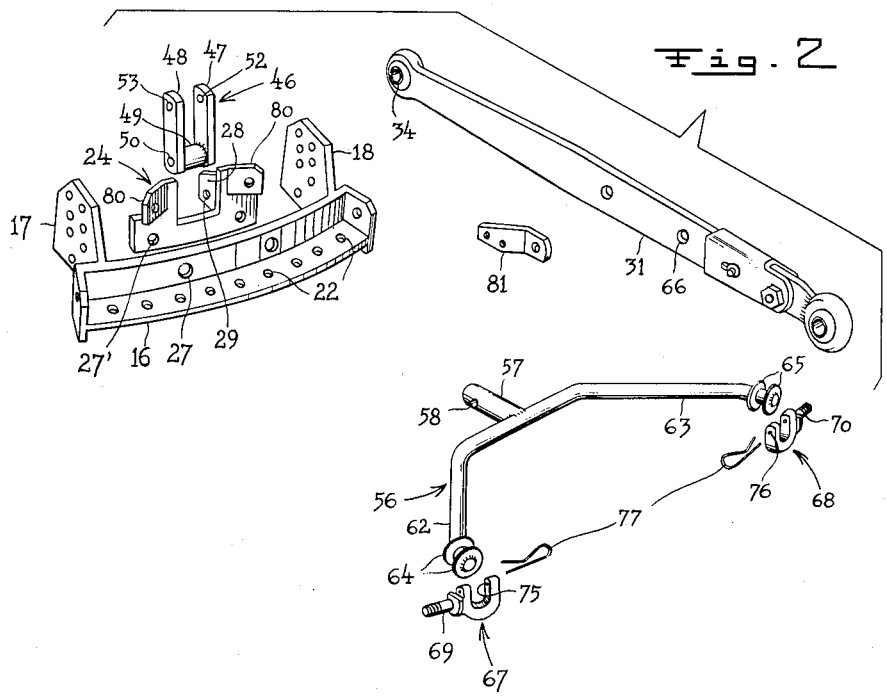
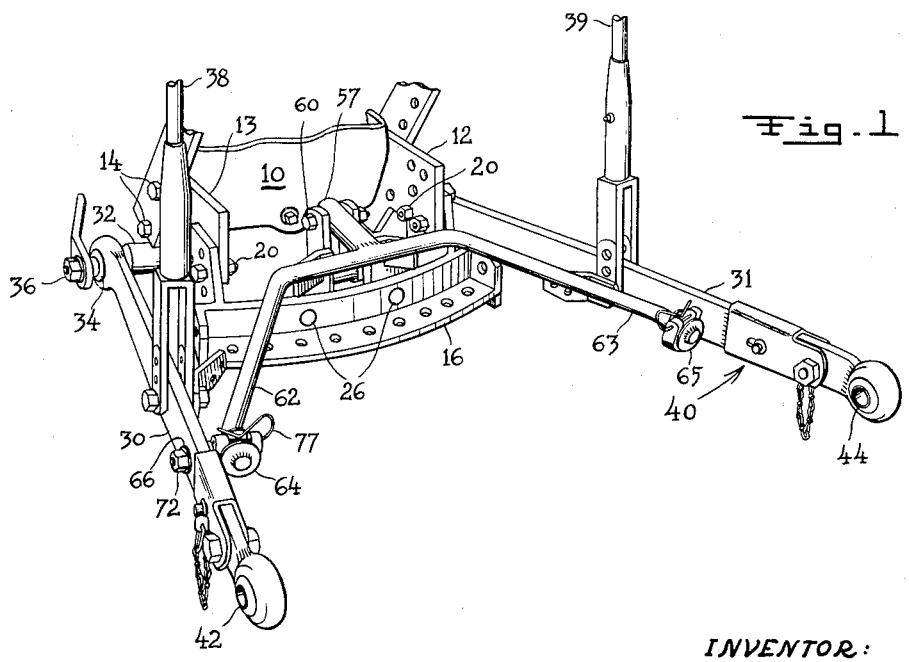
INVENTOR:
Everett W. Todd
by James E. Nilles
Attorney

United States Patent Office 2,726,589
Patented Dec. 13, 1955

2,726,589

HITCH STABILIZER

Everett W. Todd, Racine, Wis., assignor to Massey-Harris-Ferguson Inc., Racine, Wis., a corporation of Maryland Application December 20, 1954, Serial No. 476,475

4 Claims. (Cl. 97—47.65)

This invention relates to hitches for coupling an implement to a tractor and is more particularly concerned with a stabilizer for such a hitch which prevents the implement from moving laterally with respect to the tractor to which it is attached.

This invention finds particular utility in hitches in the general type disclosed in my co-pending U. S. application Serial No. 474,785, filed December 13, 1954.

An object of this invention is to provide a stabilizer for a tractor mounted implement which is particularly adaptable to a tractor and hitch having predetermined space and attaching limitations.

It is a general object of this invention to provide an improved stabilizer for a mounted implement.

It is an object of this invention to provide an improved stabilizer which is simple in construction, readily attached, and highly efficient in performing functions for which it was designed.

Other objects and advantages of this invention will become more apparent as this disclosure progresses, reference being had to the accompanying drawings, in which:

Fig. 1 is a perspective view, taken from the rear of the tractor, showing only a fragment of the tractor housing to which this invention is attached.

Fig. 2 is an exploded view of the component parts of the invention and their associated parts.

Referring more particularly to the drawings, to the tractor housing 10 is attached rearwardly extending support plates 12, 13 by means of cap bolts 14. A draw bar support 16 has forwardly extending portions 17, 18 which are secured to plates 12, 13 by means of bolts 19 and nuts 20. The draw bar (not shown) is swingably mounted on the draw bar support 16 and adjustably secured thereto by means of the spaced apertures 22 in the support member 16. A mounting bracket 24 is secured to the support member 16 by bolt and nut means 26 extending through registering apertures 27, 27' and has extending at its forward side vertically positioned spaced plates 28 (only one shown), each having an aperture 29 therethrough. Members 12, 13, 16, and 24 may be considered as a rigid integral unit which is rigidly secured to the tractor.

Two laterally spaced, lower draft links 30, 31 are pivotally attached at their forward ends to laterally extending studs 32 which are rigidly secured to the plates 12 and 13. The conventional ball and socket joints 34 at the forward ends of draft links 30, 31 are held captive on the laterally extending studs 32 by means of nuts 36 threadably engaged on the studs 32 or other suitable means. Draft links 30, 31 converge in a forwardly direction and are vertically positionable in the well known manner by means of the lift links 38, 39, respectively, which are connected with power lift arms (not shown).

The break joint connection 40 in each of the draft links 30, 31 is the subject matter of my co-pending U. S. application, Serial #326,422, filed December 17, 1952, and it is sufficient here to say that these joints facilitate the connection of the links to the implement frame.

With certain implements it is necessary that the links 30, 31 be maintained rigid in a transverse direction, that is, that they be restricted from any lateral swinging movement with respect to the tractor, and it is in use with these particular implements that this invention finds particular utility. It is necessary, however for the links 30, 31 when used with these implements, under certain conditions, to rise and fall, within limitations, independently of one another, while at the same time maintaining the hitch rigid in a lateral direction.

At the rearward ends of draft links 30, 31 are the conventional ball and socket joints 42, 44 which receive laterally extending studs carried by the implement frame. In order to attach connections 42, 44 to the implement frame, it is necessary that the links be free to move independent of one another in a lateral direction. Because of this required freedom of movement prior to being attached to the implement, stabilizer means cannot be attached until the connection between the draft links and implement frame is established. After this connection is made, there is no relative movement between the draft links 30, 31 in a lateral direction and it therefore becomes a difficult task to connect a stabilizer, of known construction, between the draft links. With the stabilizer to be described, it becomes a relatively simple matter to install it after the implement is hitched to the draft links.

This invention was designed for an existing tractor which has certain space limitations due to other component parts on the tractor such as the swinging drawbar and its support, and provides for accomplishing certain other necessary functions without disturbing other component parts.

A new and novel connector mechanism is provided between the tractor and the stabilizer to be described. Between the spaced, parallel, vertical members 28 is pivotally secured a bail member 46 comprised of parallel side plates 47, 48 rigidly secured at their lower ends as by welding to the tubular member 49. A bolt (not shown) extends through the apertures 29, apertures 50 in plates 47, 48 and through tubular member 49 and allows the bail 46 to pivot in a fore and aft direction about the bolt. The upper ends of plates 47, 48 have apertures 52, 53, respectively. A Y-shaped stabilizer member 56 has a forwardly extending leg portion 57 having an aperture 58 which registers with apertures 52, 53 of the bail 46 and is thus attached thereto by a bolt and nut 60, for pivotal movement about a transverse axis only. The width of the bail 46 is such as to fit snugly between the plates 28 and thereby prevent any twisting in a transverse direction. The only relative movement between plates 28 and bail 46 is the intended pivotal fore and aft swinging. The diameter of aperture 58 in the leg 57 is somewhat larger than the diameter of the bolt 60 with which it is secured to bail 46 for permitting slight rotational movement of leg 57 about its axis, that is, in a generally fore and aft direction, for purposes which will appear more fully hereinafter.

Novel connecting means are also provided between the stabilizer 56 and draft links 30, 31. At the rearward end of each of the arm portions 62, 63 of the Y member are welded a pair of spaced washers 64, 65 arranged in parallelism. U-shaped brackets 67, 68 having their open portion facing in an upwardly direction are rotatably mounted in the apertures 66 of links 30, 31 by means of their laterally extending pins 69, 70, respectively. These pins 69, 70 are secured within apertures 66 by means of the bolts 72 which are threadably engaged on the outer ends of pins 69, 70. The U-shaped brackets 67, 68 are thus free to rotate about a substantially transverse axis. At the free or upper ends of the U-shaped brackets are apertures 75, 76 which receive the locking snap pins 77, thereby maintaining arms 62, 63 within their respective brackets. The portion of the arm members 62, 63 between the pairs of washers 64 and 65 are adapted to be snugly received in the brackets 67, 68 respectively in such a manner so as to permit rotational movement in the bracket about a generally fore and aft axis.

Conventional chains (not shown) which limit the maximum amount of swinging of the hitch in a lateral direction when a stabilizer is not used, are connectable between ear portion 80 and attaching brackets 81 secured to the draft links.

After the implement has been connected in the sockets 42, 44 it is a relatively easy matter to secure the stabilizer in its operating position. Due to the fore and aft shifting connection between the forward end of the Y member 56 and the tractor, the stabilizer has a considerable amount of freedom of movement in the longitudinal, or fore and aft, direction and thereby affords enough "play" to facilitate making the connection. With the particular tractor for which this stabilizer was designed, it is impossible to align, on a common horizontal plane, the point of pivotal connection of the forward end of the member 56 with the points of connection of the draft links 30, 31. However, the swinging bail connection compensates for this handicap and allows the hitch to rise and fall without restriction.

In addition, due to space limitations and interference with existing component parts, it is impossible to have the point of pivotal connection of leg member 57 in the same vertical transverse plane which contain the points of pivotal connection of draft links 30, 31 with the tractor. To compensate for this handicap, the Y member 56 is allowed to rotate relative to draft links 30, 31 by means of the rotation of brackets 67, 68 within apertures 66 on a common transverse axis. Furthermore, by the use of this particular connection between the Y member 56 and the draft links, independent vertical movement of the draft links is allowed due to the rotation of the arms 62, 63 within the brackets 67, 68 on a generally fore and aft axis. By making the aperture 58 at the forward end of Y member 56 slightly larger than the bolt which receives it, as before mentioned, this slight lateral tipping is permitted. This lateral tipping, or relative vertical movement of the draft links, without lateral swaying of the entire hitch is necessary in the case of relatively wide implements. These relatively wide implements, which are usually transported by gauge wheels, require this flexibility in order to enable them to follow the undulating contour of the ground over which they traverse.

In operation the implement would be attached to the rear end of the draft links and raised slightly off the ground and it is then an easy task to install the stabilizer in the manner above described. It can now be seen that I have provided a simple stabilizer which meets all the functional requirements and which is compactly located between the draft links thus providing the necessary clearance for crop cultivation.

What I claim is:

1. In combination with a tractor having a pair of laterally spaced draft links pivotally secured thereto for vertical movement relative thereto; a Y-shaped stabilizer for said links comprising rearwardly extending arm portions and a forwardly extending leg portion, connector mechanism for securing said stabilizer to said tractor comprising a bail member pivotally secured to said tractor for swinging about a transverse axis and having upwardly extending spaced plates, said leg portion pivotally secured between said plates for pivotal movement relative thereto about a transverse axis and for limited rotational movement relative thereto about a generally fore and aft axis, each of said arm portions connected with one of said links intermediate the length of the latter for rotational movement relative thereto about a substantially common transverse axis and also for relative rotational movement about generally fore and aft axes.

2. In combination with a tractor having a pair of laterally spaced draft links pivotally secured thereto for vertical movement relative thereto; a stabilizer for said links comprising arm portions and a leg portion, connector mechanism for securing said leg portion to said tractor for pivotal movement about a transverse axis and for shifting movement in a fore and aft direction and adapted to permit slight rotational movement of said leg portion about a generally fore and aft axis, a U-shaped bracket rotatably mounted on a generally transverse axis on each of said links and having an open portion facing in an upwardly direction for the reception of said arms, said arm portions rotatably mounted in said brackets about generally fore and aft extending axes.

3. In combination with a tractor having a pair of laterally spaced draft links pivotally secured thereto for vertical movement relative thereto; a Y-shaped stabilizer for said links comprising rearwardly extending arm portions and a forwardly extending leg portion, connector mechanism for securing said stabilizer to said tractor comprising a bail member pivotally secured to said tractor for swinging about a transverse axis and having upwardly extending spaced plates, said leg portion pivotally secured between said plates for pivotal movement relative thereto about a transverse axis and for limited rotational movement relative thereto about a generally fore and aft axis, a bracket member rotatably mounted on a generally transverse axis on each of said links, said arm portions rotatably mounted in said brackets about generally fore and aft extending axes.

4. A device as described in claim 3 further characterized in that said brackets comprise a U-shaped bracket having an open portion facing in an upwardly direction for the reception of said arms.

References Cited in the file of this patent

UNITED STATES PATENTS

| | | |
|---|---|---|
| 2,379,225 | Fraga | June 26, 1945 |
| 2,414,114 | Martin | Jan. 14, 1947 |
| 2,685,240 | Wilson et al. | Aug. 3, 1954 |
| 2,690,109 | Frevik et al. | Sept. 28, 1954 |